United States Patent
Moulton et al.

(10) Patent No.: US 11,225,425 B1
(45) Date of Patent: Jan. 18, 2022

(54) APPARATUS AND METHOD FOR RECYCLING BLACKWATER AND GREYWATER AT OIL AND GAS WELL SITES

(71) Applicant: STALLION OILFIELD SERVICES LTD., Houston, TX (US)

(72) Inventors: Justin Vance Moulton, Victor, ID (US); Hal D. Hingson, Carlsbad, NM (US)

(73) Assignee: STALLION OILFIELD SERVICES LTD., Houston, TX (US)

( * ) Notice: Subject to any disclaimer, the term of this patent is extended or adjusted under 35 U.S.C. 154(b) by 0 days.

(21) Appl. No.: 16/879,250

(22) Filed: May 20, 2020

Related U.S. Application Data (63) Continuation of application No. 16/007,495, filed on Jun. 13, 2018, now Pat. No. 10,669,177.

(60) Provisional application No. 62/519,692, filed on Jun. 14, 2017.

(51) Int. Cl.

| | |
|---|---|
| *C02F 3/20* | (2006.01) |
| *C02F 9/00* | (2006.01) |
| *B01D 21/24* | (2006.01) |
| *B01D 21/02* | (2006.01) |
| *C02F 103/00* | (2006.01) |
| *C02F 1/00* | (2006.01) |
| *C02F 1/76* | (2006.01) |
| *C02F 1/32* | (2006.01) |

(52) U.S. Cl.
CPC .............. *C02F 3/20* (2013.01); *B01D 21/02* (2013.01); *B01D 21/2444* (2013.01); *C02F 9/00* (2013.01); *C02F 1/004* (2013.01); *C02F 1/32* (2013.01); *C02F 1/76* (2013.01); *C02F 2001/007* (2013.01); *C02F 2103/002* (2013.01); *C02F 2103/005* (2013.01); *C02F 2203/006* (2013.01); *C02F 2203/008* (2013.01); *C02F 2303/04* (2013.01)

(58) Field of Classification Search
None
See application file for complete search history.

(56) References Cited

U.S. PATENT DOCUMENTS

| | | |
|---|---|---|
| 4,650,577 A | 3/1987 | Hansel |
| 4,983,285 A | 1/1991 | Nolen |
| 5,032,276 A | 7/1991 | Mackrle et al. |
| 5,196,114 A | 3/1993 | Burwell |

(Continued)

*Primary Examiner* — Chester T Barry
(74) *Attorney, Agent, or Firm* — MH2 Technology Law Group LLP (57) ABSTRACT

A bioreactor for a water treatment system includes an aerator tank configured to receive an influent liquid, and a clarifier positioned in the aerator tank, the clarifier having a generally conical shape and defining a downwardly-facing opening. An interior of the clarifier is in communication with the aerator tank, external to the clarifier, at least via the downwardly-facing opening, and wherein the clarifier is positioned non-concentrically with the aerator tank. The bioreactor further includes a plurality of aeration vents positioned proximal to a bottom of the tank and configured to direct air into the aerator tank, and an effluent outlet positioned in the clarifier. A relatively clean effluent liquid, in comparison to the influent liquid in the aerator tank, exits from the clarifier via the effluent outlet.

15 Claims, 8 Drawing Sheets

(56) References Cited

U.S. PATENT DOCUMENTS

| | | | |
|---|---|---|---|
| 5,221,470 | A | 6/1993 | McKinney |
| 5,490,935 | A | 2/1996 | Guy |
| 5,549,818 | A | 8/1996 | McGrew, Jr. |
| 5,766,459 | A | 6/1998 | Adams, Jr. |
| 5,770,081 | A * | 6/1998 | McKinney ............ C02F 3/1242 210/620 |
| 5,785,854 | A | 7/1998 | McKinney |
| 5,874,002 | A | 2/1999 | Cormier |
| 6,096,203 | A | 8/2000 | Drewery |
| 6,106,704 | A * | 8/2000 | Drewery ................ C02F 3/006 210/86 |
| 6,165,359 | A | 12/2000 | Drewery |
| 6,193,220 | B1 * | 2/2001 | Kelly ................ B01F 3/04113 261/23.1 |
| 6,200,472 | B1 | 3/2001 | Donald et al. |
| 6,217,761 | B1 * | 4/2001 | Catanzaro ............ C02F 3/1242 210/195.4 |
| 6,228,258 | B1 | 5/2001 | Hubbard et al. |
| 6,358,411 | B1 | 3/2002 | McKinney |
| 6,406,619 | B1 | 6/2002 | Hubbard et al. |
| 6,982,033 | B2 | 1/2006 | Donald |
| 7,341,660 | B1 | 3/2008 | Guy et al. |
| 7,651,608 | B2 | 1/2010 | McKinney |
| 2010/0300544 | A1 * | 12/2010 | Baldwin ................ E03B 3/03 137/1 |
| 2011/0186491 | A1 * | 8/2011 | McKinney ................ C02F 3/02 210/151 |
| 2016/0016835 | A1 * | 1/2016 | McKinney ................ C02F 9/00 210/136 |
| 2017/0283291 | A1 | 10/2017 | Sabo et al. |
| 2019/0367393 | A1 * | 12/2019 | Assadi ...................... B09B 3/00 |

* cited by examiner

APPARATUS AND METHOD FOR RECYCLING BLACKWATER AND GREYWATER AT OIL AND GAS WELL SITES

CROSS-REFERENCE TO RELATED APPLICATIONS

This application is a continuation of U.S. patent application Ser. No. 16/007,495, which was filed on Jun. 13, 2018, now U.S. Pat. No. 10,669,177, and claims priority to to U.S. Provisional Patent Application No. 62/519,692, filed on Jun. 14, 2017. Each of these priority applications is incorporated herein by reference in its entirety.

BACKGROUND

Clean water used by personnel performing labor at oil and gas well sites is commonly delivered and stored in water tanks at the well site. Water is also needed at well sites during drilling operations for drilling fluid, also called drilling mud. The purchase, delivery, and storage of water at well sites can be a significant part of overhead associated with drilling operations.

Many tasks and operations at oil and gas well sites, including drilling operations, require human labor. The presence of personnel at the well site and their water needs may vary. Most if not all personnel at well sites require the use of on-site restrooms. Personnel residing at well sites over multiple days require running water for drinking, cooking, cleaning dishes, and washing clothes. Consequently, human activity at oil and gas well sites commonly results in at least two types of wastewater: blackwater and greywater.

Blackwater results from restrooms and is wastewater containing feces, urine and flushwater from flush toilets or toilet paper. Greywater or sullage is generally wastewater generated in households or office buildings from streams without fecal contamination, i.e. all streams except for the wastewater from toilets. Greywater may include the wastewater resulting from cleaning dishes and washing clothes. Blackwater and greywater are to be distinguished from "produced water," which term is used in the oil industry to describe water that is produced as a byproduct along with the oil and gas.

Generally, blackwater and greywater resulting from human activity cannot simply be disposed of at an oil or gas well site; rather, industry practice has been to collect the wastewater in holding tanks and then transport it to remote locations for treatment. Often municipal water treatment facilities are contracted to receive and treat blackwater and greywater. The cost for wastewater transport services and to compensate municipal wastewater treatment facilities can significantly increase overhead for well site operations.

There are a number of challenges with collecting and treating blackwater and greywater. Treatment of such wastewater has often had to rely on municipal water treatment facilities or other more permanent water treatment systems. Such facilities may be permanently located at great distances from remote well sites. Further, the water treatment facilities are generally not built for specific well sites or groups of well sites because of the extensive resources and costs to build them. Likewise, the tentative viability of well sites and scarcity of well sites in a given group to be served make it infeasible to build permanent water treatment facilities for specific well sites or groups of well sites. Once a water treatment facility is built, it is usually fixed to a location and cannot be transported to new sites when needed.

Also, greywater from certain greywater sources at well sites contains substantial amounts of diesel, oil, grease, cuttings, and or drilling mud. Some of these contaminants, such as diesel, kill or otherwise inhibit growth of bacteria and other microorganisms useful for the treatment of waste water.

SUMMARY

A bioreactor for a water treatment system is disclosed. The bioreactor includes an aerator tank configured to receive an influent liquid, and a clarifier positioned in the aerator tank, the clarifier having a generally conical shape and defining a downwardly-facing opening. An interior of the clarifier is in communication with the aerator tank, external to the clarifier, at least via the downwardly-facing opening, and wherein the clarifier is positioned non-concentrically with the aerator tank. The bioreactor further includes a plurality of aeration vents positioned proximal to a bottom of the tank and configured to direct air into the aerator tank, and an effluent outlet positioned in the clarifier. A relatively clean effluent liquid, in comparison to the influent liquid in the aerator tank, exits from the clarifier via the effluent outlet.

A water treatment system is also disclosed. The system includes a bioreactor including an aerator tank configured to receive an influent liquid, and a first clarifier positioned in the aerator tank, the first clarifier having a generally conical shape and defining a downwardly-facing opening. An interior of the first clarifier is in communication with the aerator tank, external to the first clarifier, at least via the downwardly-facing opening. The first clarifier is positioned non-concentrically with the aerator tank. The bioreactor also includes a plurality of aeration vents positioned proximal to a bottom of the tank and configured to direct air into the aerator tank, and an effluent outlet positioned in the clarifier. A relatively clean effluent liquid, in comparison to the influent liquid in the aerator tank, exits from the clarifier via the effluent outlet. The system further includes a second clarifier in communication with the effluent outlet of the clarifier of the bioreactor, a filter tank in fluid communication with the second clarifier, an ultraviolet (UV) filter in fluid communication with the filter tank, a chlorinator in fluid communication with the UV filter, and a transfer tank in fluid communication with the chlorinator.

BRIEF DESCRIPTION OF THE DRAWINGS

The present disclosure may best be understood by referring to the following description and accompanying drawings that are used to illustrate embodiments of the invention. In the drawings.

DETAILED DESCRIPTION

The following disclosure describes several embodiments for implementing different features, structures, or functions of the invention. Embodiments of components, arrangements, and configurations are described below to simplify the present disclosure; however, these embodiments are provided merely as examples and are not intended to limit the scope of the invention. Additionally, the present disclosure may repeat reference characters (e.g., numerals) and/or letters in the various embodiments and across the Figures provided herein. This repetition is for the purpose of simplicity and clarity and does not in itself dictate a relationship between the various embodiments and/or configurations discussed in the Figures. Moreover, the formation of a first feature over or on a second feature in the description that follows may include embodiments in which the first and second features are formed in direct contact, and may also include embodiments in which additional features may be formed interposing the first and second features, such that the first and second features may not be in direct contact. Finally, the embodiments presented below may be combined in any combination of ways, e.g., any element from one exemplary embodiment may be used in any other exemplary embodiment, without departing from the scope of the disclosure.

Additionally, certain terms are used throughout the following description and claims to refer to particular components. As one skilled in the art will appreciate, various entities may refer to the same component by different names, and as such, the naming convention for the elements described herein is not intended to limit the scope of the invention, unless otherwise specifically defined herein. Further, the naming convention used herein is not intended to distinguish between components that differ in name but not function. Additionally, in the following discussion and in the claims, the terms "including" and "comprising" are used in an open-ended fashion, and thus should be interpreted to mean "including, but not limited to." All numerical values in this disclosure may be exact or approximate values unless otherwise specifically stated. Accordingly, various embodiments of the disclosure may deviate from the numbers, values, and ranges disclosed herein without departing from the intended scope. In addition, unless otherwise provided herein, "or" statements are intended to be non-exclusive; for example, the statement "A or B" should be considered to mean "A, B, or both A and B."

Figure 1:
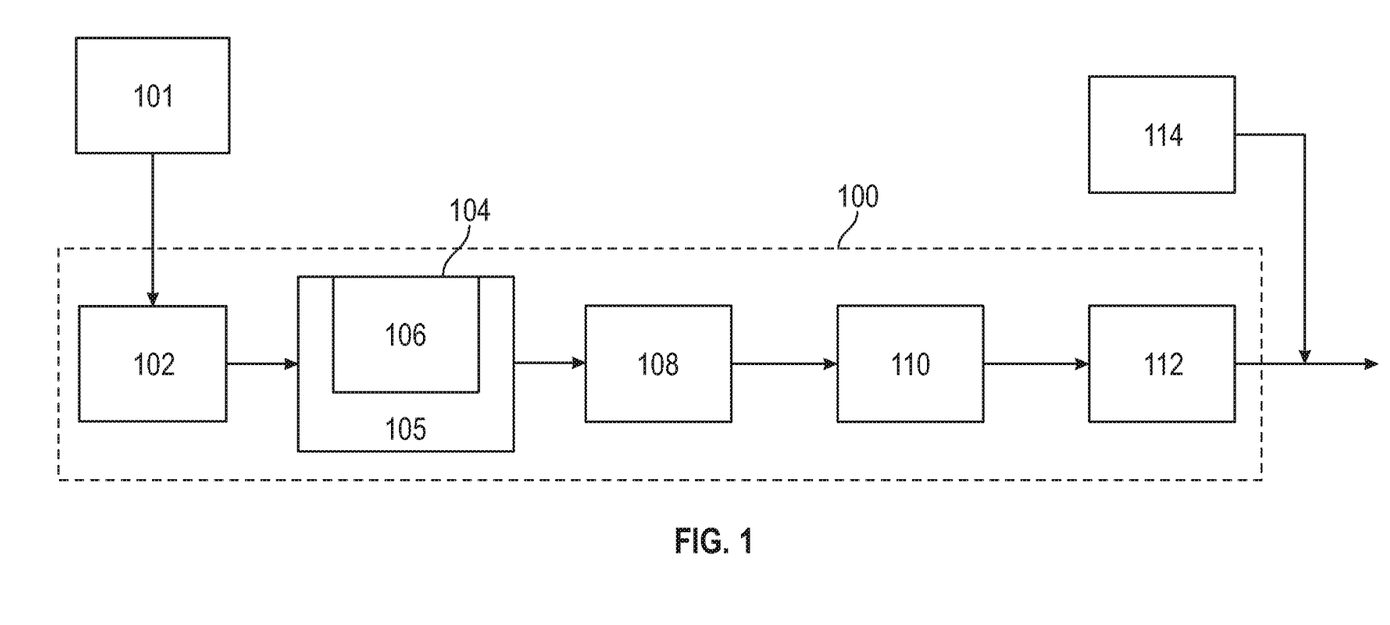
FIG. 1 illustrates a flow diagram of a wastewater treatment system, according to an embodiment.

FIG. 1 illustrates a flow diagram of a wastewater treatment system 100, according to an embodiment. The system 100 may receive a primary (e.g., blackwater or graywater) wastewater stream ("influent fluid") from a primary source 101. The primary influent fluid may be received from sources that are generally considered to be free from contaminants that are known to kill or negatively impact growth of useful bacteria in the water treatment process (e.g., hydrocarbons such as diesel, acids, bleach, etc.). The primary source 101 may include greywater from most or all greywater sources, including from all washing machines, dishwashers, showers, sinks, etc., other than the secondary or designated greywater source, in general, so long as the greywater sources are maintained generally free from the aforementioned contaminates.

The primary influent fluid may be directed to a pre-clarifying assembly 102, which may include a first settling tank for receiving waste water, and an influent water tank, among potentially other structures. One example of the first settling tank may include dimensions for holding about 1,000 gallons, 1,250 gallons, or 1,500 gallons of water. The first settling tank may include an outlet that is configured to accept influent from a point along the height of the first settling tank, proximal to the top, such that relatively clean influent is taken, rather than solids, which have settled to the bottom, or floating contaminants on the top. Fats and oils from waste water in the first settling tank rise toward the top of the water and cleaner water from the middle section of the first settling tank is removed and transferred to an influent tank using gravity transfer.

A baffle having holes or slots to permit the passage of water is disposed horizontally within the first settling tank approximately adjacent to a region just below the middle region of the first settling tank. The baffle facilitates reduction of water movement between the middle region of the first settling tank where clarified water aggregates and the lower region of the first settling tank where solids can settle and accumulate. The baffle disposed in the first settling tank helps separate settled dirty water from middle clarified or partially clarified water. The first settling tank also includes a water conduit or pipe, which can be made of PVC, configured for transferring clarified or partially clarified water from the first settling tank. The PVC pipe or conduit is fluidly connected to the effluent port on the inside of the first settling tank and extends approximately halfway into the first settling tank in the middle region of the tank where the clarified or partially clarified water resides. An opening near the end of the PVC pipe at the middle region of the first settling tank allows clarified water to exit the first settling tank through the PVC pipe. Clarified water traveling through the PVC pipes passes through the effluent port and into flexible rubber hose that couples the first settling tank with the influent tank. As water is pumped into the first settling tank, hydraulics force clarified water through the PVC pipe, the effluent port, and the flexible rubber hose so that the clarified or partially clarified water transfers into the influent tank.

The influent tank may also made of a light polycarbonate plastic and is used for holding water received from the first settling tank until sufficient water has been received for delivery to the bioreactor tank. The influent tank can be a doorway tank which can be configured with a range of dimensions for holding water ranging from about 50 gallons to about 500 gallons of water. In an embodiment, the influent tank is a 250-gallon doorway tank. The influent tank may be configured with a float-switch that triggers a pump when the water level reaches a desired level in the influent tank. When water diminished of fats and oils reaches a desired level in the influent tank, the float-switch triggers the influent tank pump, and water is pumped from the influent tank through water conduits into a bioreactor tank configured for combined aeration and clarifying.

As mentioned above, the influent fluid received from the influent tank may be directed to the bioreactor tank (also referred to herein as a bioreactor) 104, which may include a combination of a conical clarifier 106 and an aerator tank 105. In particular, the conical clarifier 106 may be positioned within the aerator tank 105, as will be described in greater detail below. The bioreactor tank 104 is configured with appropriate dimensions for increased water surface area to reduce the rate at which water levels change. The bioreactor tank is a vertical tank made of a light polycarbonate plastic polymer configured with a range of dimensions for holding water ranging from about 1,000 gallons to about 1,700 gallons of water. Further, the mixed liquor (activated solids and fluids) in the bioreactor tank 104 may be held at a pH between about 7 and about 8. Further, the dissolved oxygen levels in the mixed liquor in the aerator tank 105 may range from about 1 mgL to about 5 mgL.

Solids settleability characteristics within the aerated mixture in the bioreactor tank 104 can be measured using a settleability test. A 15-minute settleability test can be run using a (e.g., 1,000 mL) beaker. The bioreactor 104 may be properly operated where settlement measurements are between about 150 mgL and 600 mgL. In an embodiment, the optimal settlement level measured by the 15 minute settleability test is between about 200 mgL and 300 mgL when other parameters are within optimal ranges. The settlement level range may fluctuate depending on bioreactor water temperatures. Bio-augmentation nutrient levels will vary depending on the life forms seen under the microscope.

Water in the bioreactor tank may be maintained at between 70 and 95 degrees Fahrenheit to promote bacteria growth. The water temperature within the bioreactor tank 104 can be moderated in several ways. Water heaters with thermal controls can be disposed within the water in the bioreactor tank 104. Likewise, air temperature within the insulated metal storage shipping container can be moderated, which in turn helps control or buffer the water temperature within the bioreactor tank 104. Air temperature within a container in which the bioreactor tank 104 is held (discussed below with reference to FIG. 3) may be controlled using portable air conditioning or heating units with thermal controls.

The bioreactor tank 104 may include an effluent outlet, which removes relatively clean effluent fluid (as compared to the influent fluid) from within the conical clarifier 106, and directs the effluent fluid to a second clarifier 108, and then to a post-clarifying assembly 110. As will be described in greater detail below, the post-clarifying assembly 110 may include one or more filter tanks, chlorinators, ultraviolet (UV) filters, transfer tanks, pumps, etc. After passing through the post-clarifying assembly 110, the effluent fluid may be pumped into a wastewater tank 112. The effluent fluid in the wastewater tank 112 may then be combined with wastewater from a secondary source 114 for use in oil rig operations, such as drilling fluid, boiler water, pressure washing fluid, etc.

In some embodiments, the secondary source may be greywater that is potentially contaminated with hydrocarbons or other compositions that may harm bacteria, e.g., in the bioreactor tank 104, and is thus not treated through the system 100 with the influent fluid from the primary source 101. As such, greywater processing is separated so that greywater from a primary source may be treated separately from a secondary or designated greywater source. The secondary or designated greywater source includes waste water from a designated washer for washing rig hands' clothes and materials soiled with contaminants that can kill or inhibit growth of useful bacteria and other microorganisms. The greywater from the secondary or designated greywater source may include substantial amounts of diesel, oil, grease, cuttings, and or drilling mud.

Figure 2A:
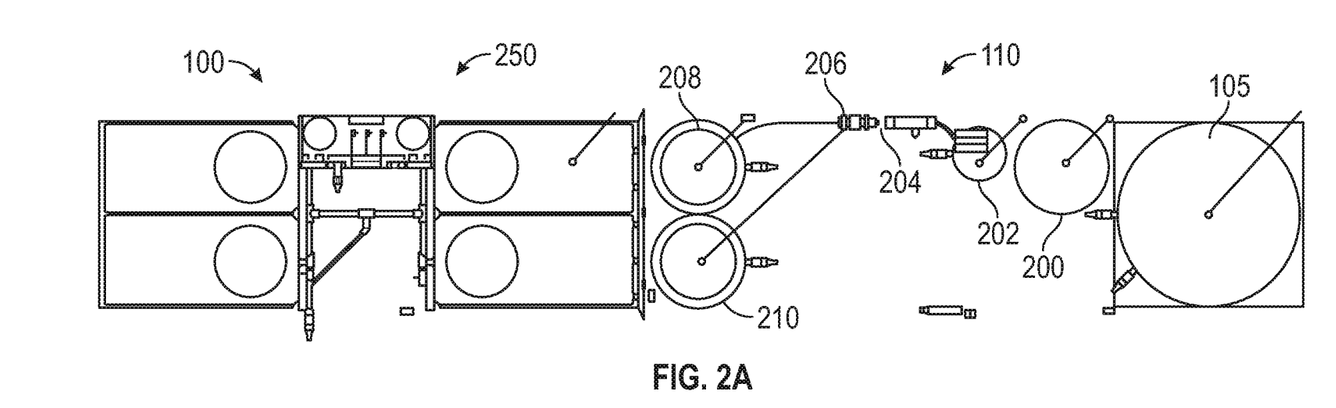
FIGS. 2A and 2B illustrates a plan view and an elevation view, respectively, of the wastewater treatment system, according to an embodiment.
Figure 2B:
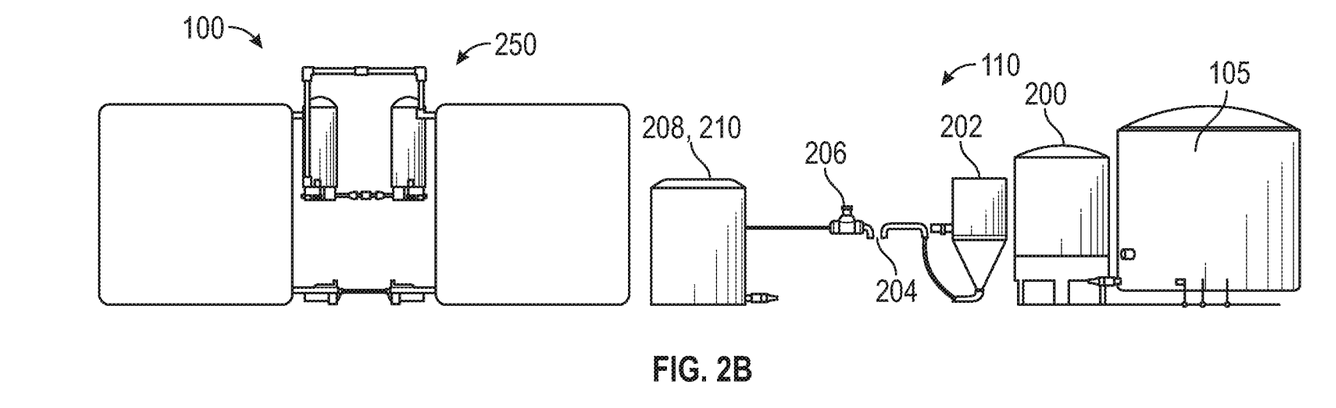

Turning now to FIGS. 2A and 2B, there is shown a plan view and an elevation view, respectively, of the wastewater treatment system 100, according to an embodiment. As shown, the system 100 includes the bioreactor tank 104. FIGS. 2A and 2B also depict additional elements of the post-clarifying assembly 110, namely, in this embodiment, a second clarifier 200, a filter tank 202, a UV filter 204, a chlorinator 206, a transfer tank 208, and a wastewater tank 210. In a specific embodiment, the post-clarifying assembly 110 also includes one or more flexible pipes (e.g., pipe 212), which connect the elements together, facilitating the mobility of the system 100.

The second clarifier 200 may be a vertical tank made of a light polycarbonate plastic polymer. The second clarifier 200 may be configured with a range of dimensions for holding between about 300 and about 500 gallons of water. The inside bottom of the second clarifier 200 may be cone-shaped and funnel toward the center where a solids removal port is disposed. Solids settled in the second clarifier 200 may be removed from the tank by via the solids removal port.

Water clarified in the second clarifier 200 may be conveyed using gravity and/or hydraulics through water conduits to the filter tank 202, which may be a gravity filter tank 202. The gravity filter tank 202 may be a vertical tank made of a light and durable polycarbonate plastic. The inside bottom of the gravity filter tank 202 may be cone-shaped and funnel toward the center where a solids removal port is disposed. Solids accumulating in the bottom of the gravity filter tank 202 may be removed from the tank through the solids removal port. The gravity filter tank 202 may be configured with a range of dimensions for holding from between about 40 and about 100 gallons of water. The gravity filter tank 202 may use various filter media. Crushed pumice works may be employed as the gravity filter media for removing residual particles without clogging the gravity filter. It is understood that other filter media such as sand or GAC could also be used in the gravity filter tank 202.

The transfer tank 208 may be a cylindrical vertical tank and is made of a light and durable polycarbonate plastic. The transfer tank 208 may be configured with a range of dimensions for holding from about 200 gallons and 350 gallons of water. The transfer tank 208 may be configured with a float-switch that triggers a pump when the water level reaches a desired level in the transfer tank. Water is then pumped from the transfer tank 208 to a rig tank or day tank. Treated water conveyed from the transfer tank 208 to the rig tank or day tank can then be used for other operations at the well site, such as drilling operations, pressure washing the rig, or for boilers to heat the rig. The rig tanks/day tanks may hold from about 40,000 gallons to about 80,000 gallons of water.

The system 100 may also include a freshwater holding assembly 250, which may include filters, pumps, tanks, etc., as desired. However, the freshwater holding assembly 250 may not be in direct communication with the other elements of the system 100. In particular, the system 100, including the freshwater holding assembly 250 may be conveniently stored and mobile within a container, such as the container 350 shown in FIG. 3, along with at least some of the other tanks of the system 100.

Figure 3:
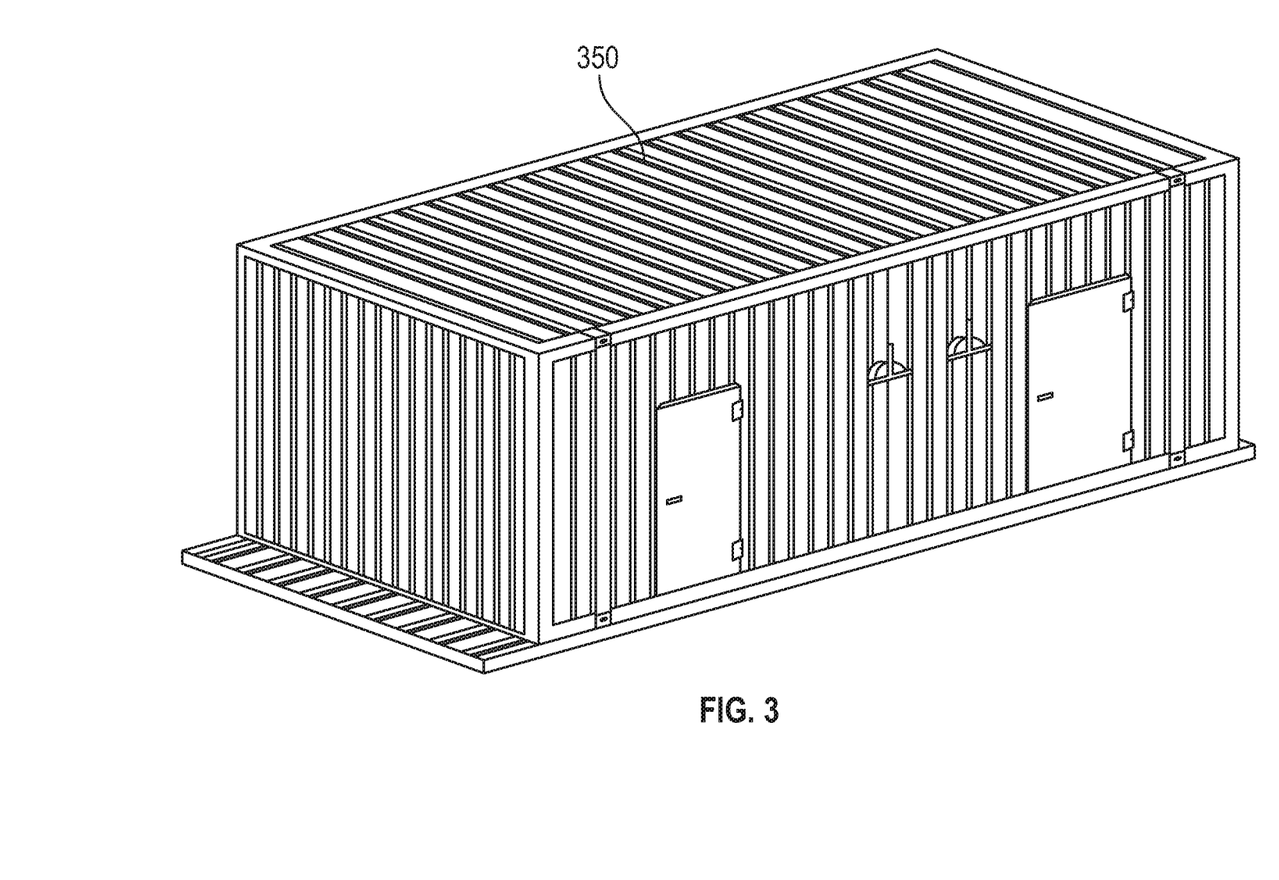
FIG. 3 illustrates a perspective view of a container in which the wastewater treatment may be housed, according to an embodiment.

Typically, water treatment systems in oil rigs may include multiple such containers; however, rig area is valuable. Embodiments of the present system 100 may fit in a single container 350, not only increasing mobility, but also minimizing the footprint of the system 100. In an embodiment, the container 350 may be metal, and configured as a standard shipping container.

The internal storage area of the metal storage/shipping container 350 may be divided so that there is an area devoted to the storage and transfer of fresh water (e.g., clean water transported to the well site for use by well site personnel), and an area devoted to the primary and secondary segments of the water treatment system. The area within the metal storage container devoted to the primary and secondary segments of the water treatment system may extend approximately 24 feet along the length of the inside of the metal storage container and be divided by a wall configured between the water treatment area and the fresh water storage area. The fresh water storage area is disposed on the other side of the wall within the storage container opposite the water treatment area. The fresh water storage area may extend approximately twenty feet along the length of the inside of the storage container on the other side of the wall opposite the water treatment area.

A plurality of polycarbonate plastic water tanks are disposed within the water storage area. For example, four fresh water tanks may be disposed in the fresh water storage area with each tank having dimensions of about 88 inches high by about 88 inches long by about 44 inches wide. Further, the first settling tank may be disposed outside of the metal storage container adjacent to the influent water tank.

Figure 4:
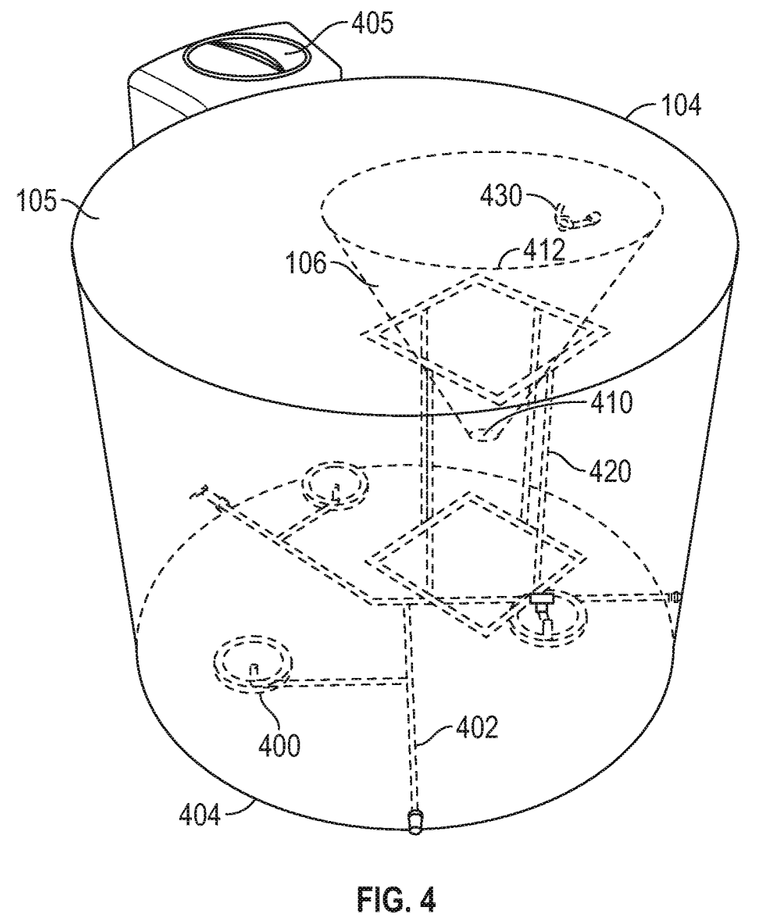
FIG. 4 illustrates a perspective view of a bioreactor tank, according to an embodiment.

FIG. 4 illustrates a perspective view of the bioreactor tank 104, showing the aerator tank 105 and the conical clarifier 106 positioned therein. The bioreactor tank 104 may include an inlet port 405, which may be offset from the conical clarifier 106, so as to avoid influent being received directly from the inlet port 405 to the interior of the conical clarifier 106.

The conical clarifier 106 is relatively small in comparison to the aerator tank 105. In some embodiments, the conical clarifier 106 occupies no more than $\frac{1}{8}^{th}$ of the volume of the aerator tank 105. Moreover, FIG. 4 illustrates the aerator tank 105 as being clear, and in some embodiments, it is made of a clear or translucent polymer material (e.g., polycarbonate), which provides a quick reference as to the operating state of the bioreactor tank 104. Indeed, any of the aforementioned tanks discussed herein may be fabricated using a clear polymer. In other embodiments, the bioreactor tank 104 (and/or any of the other tanks discussed herein) may be made from an opaque material, such as fiberglass, other polymers, composites, metal, etc.

The aerator tank 105 may include an aeration assembly, and in particular, a plurality of aerator vents 400 connected together via one or more air lines 402 which may be configured to receive air, e.g., compressed air, from an air source. As shown, the aerator vents 400 may be diffusers, configured to disperse air received therein. Further, the aerator vents 400 may be positioned at or proximal to a bottom 404 of the aerator tank 105, e.g., below the level of the conical clarifier 106. However, the aerator vents 400 may not be positioned directly under the bottom 410 of the conical clarifier 106, so as to avoid sending air into the bottom 410 of conical clarifier 106, which may be open or otherwise in fluid communication with the aerator tank 105.

The bioreactor tank 104 may further be provided with a support stand 420 for supporting the conical clarifier 106 in the aerator tank 105. The stand 420 may be made from tubular members (e.g., PVC pipes) joined together to hold the conical clarifier 106 at a prescribed height. For example, the conical clarifier 106 may be held such that its top 412 is slightly above the maximum fluid line of the aerator tank 105.

As can also be seen in FIG. 4, the conical clarifier 106 may include an effluent outlet 430. The effluent outlet 430 may extend into the side of the conical clarifier 106, e.g., between the bottom 410 and the top 412 of the conical clarifier 106. Additional details regarding embodiments of the effluent outlet 430 are discussed below.

Figure 5:
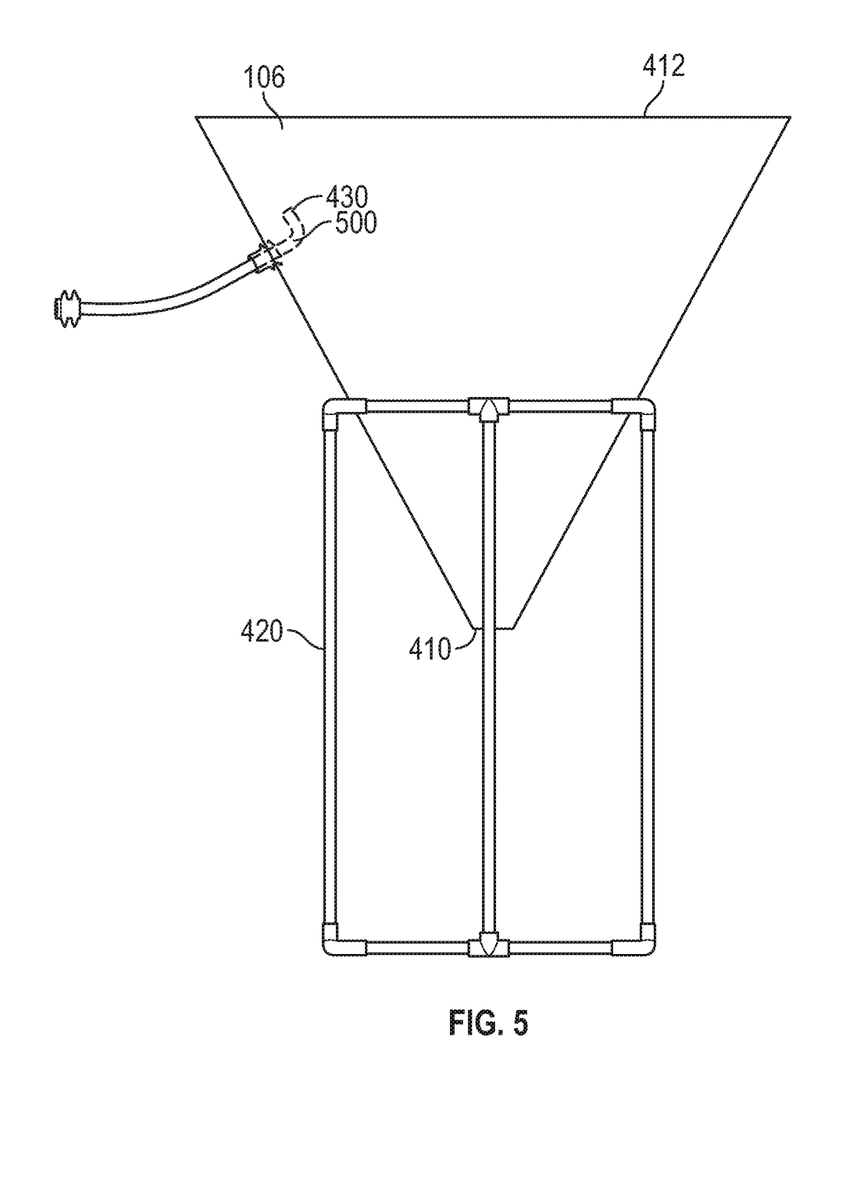
FIG. 5 illustrates a side, elevation view of a conical clarifier, according to an embodiment.

FIG. 5 illustrates a side, elevation view of the conical clarifier 106, according to an embodiment. As shown, the conical clarifier 106 is supported on the stand 420. Further, as shown, the conical clarifier 106 may be truncated at its bottom 410, rather than coming to a point. The truncated bottom 410 may include an opening, such that the interior of the conical clarifier 106 is in fluid communication with the surrounding aerator tank 105 (e.g., FIG. 4).

Further, the effluent outlet 430 is shown, extending through the side of the conical clarifier 106. As can be seen, the effluent outlet 430 includes an upwardly-turned end 500. The upwardly-turned end may be configured to be received into a weir, so as to prevent floating debris from exiting the conical clarifier 106.

Figure 6:
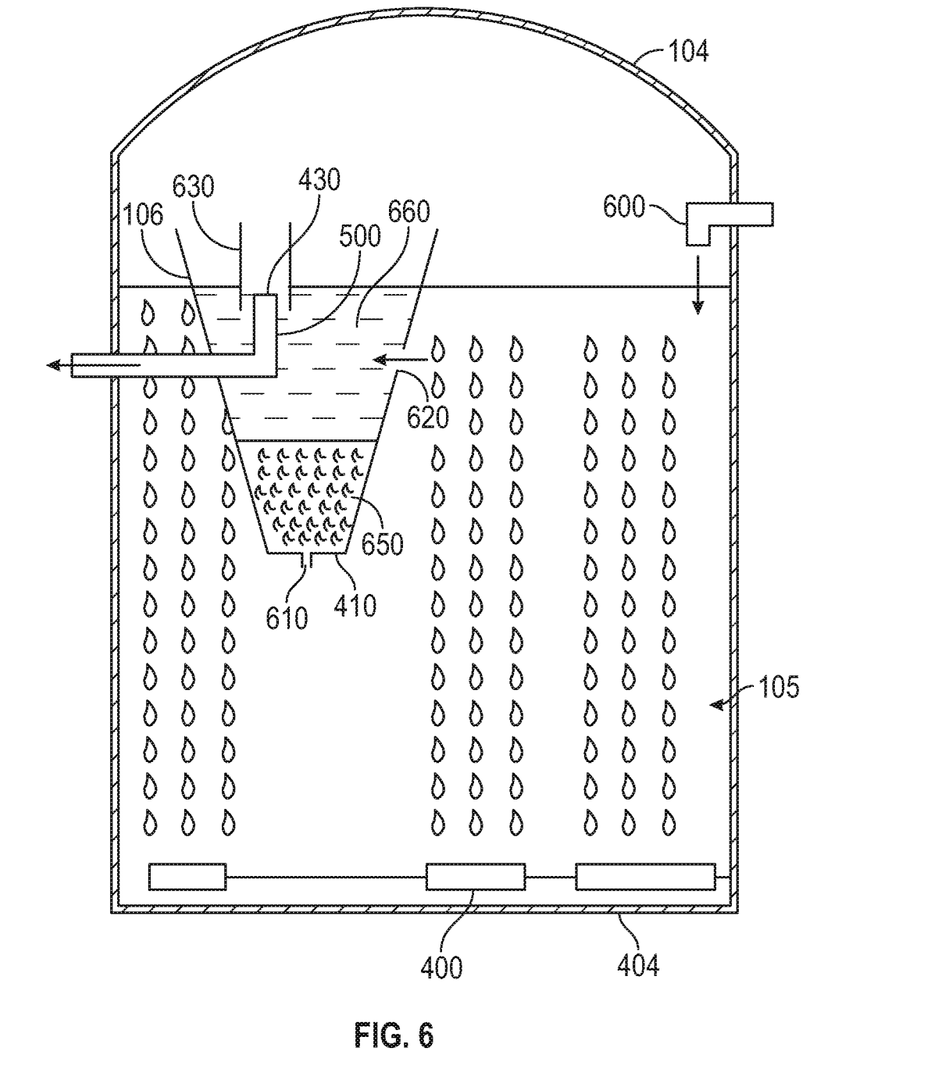
FIG. 6 illustrates a side, cross-sectional, conceptual view of the bioreactor tank including the conical clarifier, according to an embodiment.

FIG. 6 illustrates a simplified, side, cross-sectional view of the bioreactor tank 104, according to an embodiment. As shown, influent is deposited into the aerator tank 105 via an inlet 600. The aerator vents (e.g., diffusers) 400 are positioned along the bottom 404 of the aerator tank 105, but are not positioned directly below the bottom 410 of the conical clarifier 106. As such, air bubbles emanating from the vents 400 are directed into the aerator tank 105, to agitate the influent and promote bacteria activity, but may not be directed to the bottom 410. This may prevent the bubbles, which are generally intended to agitate the fluids in the aerator tank 105, from agitating the fluid in the conical clarifier 106, despite a downwardly-facing opening 610 extending through the bottom 410 of the conical clarifier 106.

FIG. 6 also illustrates a lateral opening 620 extending through the sidewall of the conical clarifier 106. The lateral opening 620 allows for ingress of influent from the aerator tank 105 directly into the conical clarifier 106. Further, a weir 630 is provided, as mentioned above, surrounding the upwardly-turned end 500 of the effluent outlet 430. As shown, the weir 630 may be tubular and may extend downwardly, past the surface of the fluid in the conical clarifier 106, so as to prevent floating debris from entering the effluent outlet 430.

In operation, the agitated, aerated influent in the aerator tank 105 communicates with the interior of the conical clarifier 106 by way of the lateral opening 620. Within the conical clarifier 106, the influent is generally held quiescent, allowing for gravity-based separation of entrained solids 650 from the effluent fluid 660. The effluent fluid 660 drains, e.g., by operation of gravity, around the weir 630 and into the effluent outlet 430, for movement to the post-clarifying assembly discussed above. The solids 650 may drop through the downwardly-facing opening 610 and back into the aerator tank 105, or may remain in the conical clarifier 106.

Figure 7A:
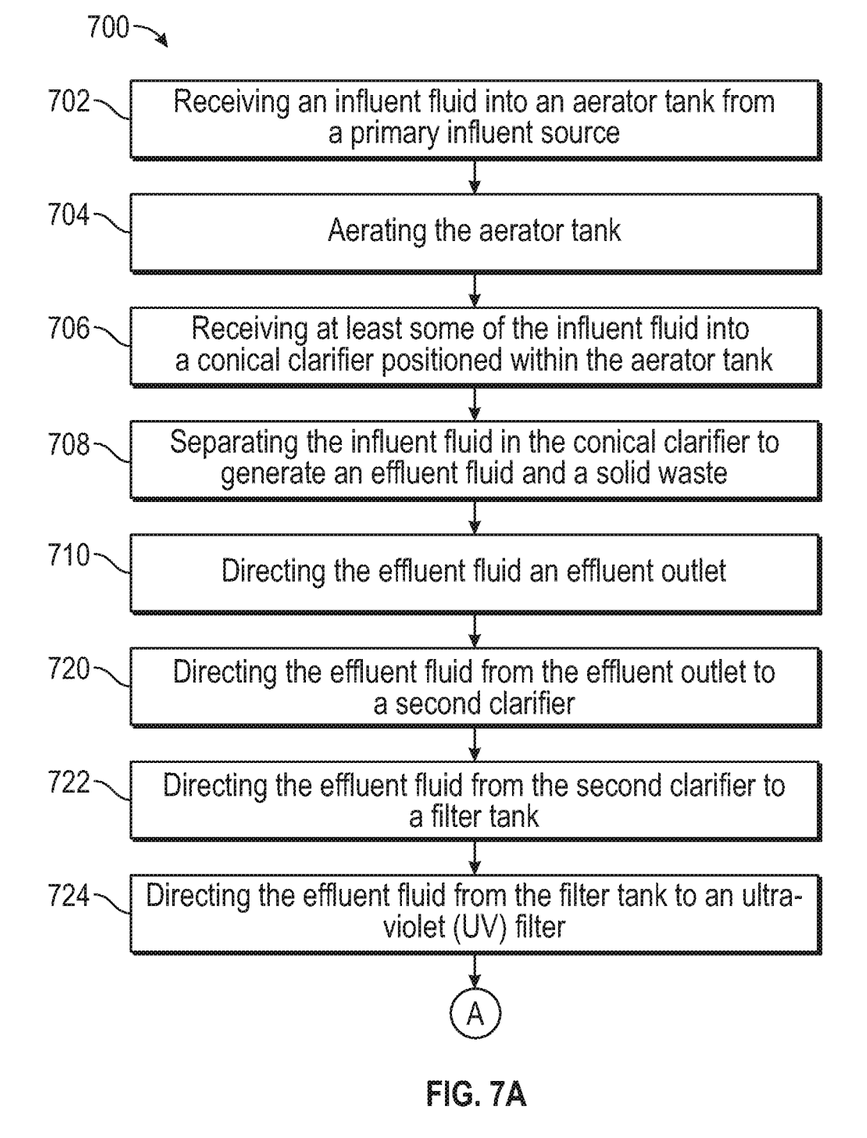
FIGS. 7A and 7B illustrate a flowchart of a method for treating wastewater, according to an embodiment.
Figure 7B:
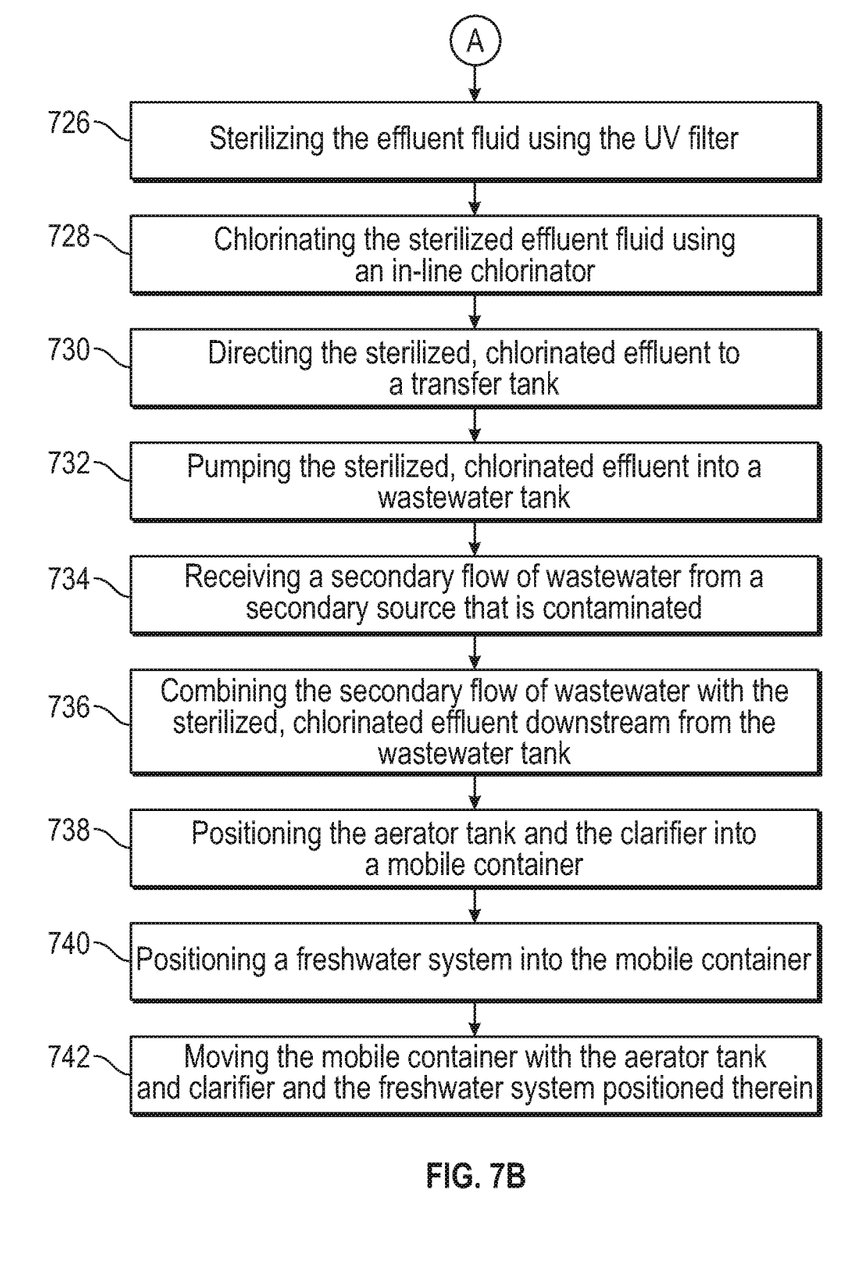

FIG. 7 illustrates a flowchart of a method 700 for treating wastewater, according to an embodiment. The method 700 may proceed by operation of one or more embodiments of the system 100 discussed above, but in other embodiments, may be executed by one or more other systems. Furthermore, the steps of the method 700 may be executed in an order other than what is shown, or the various steps may be combined, separated, or done in parallel without departing from the scope of the present disclosure.

The method 700 may begin by receiving an influent fluid into an aerator tank 105 from a primary influent source 101, as at 702. However, the influent fluid may be received at one or more pre-processing tanks/structures, as desired, prior to being received into the aerator tank 105. The method 700 may further include aerating the aerator tank 105 using a plurality of aerator vents 400 positioned proximal to a bottom 404 of the aerator tank 105, as at 704. The aerator vents 400 may be or include diffusers positioned along the bottom 404 of the aerator tank 105, and may not be positioned directly below the conical clarifier 106.

The method 700 may also include receiving at least some of the influent fluid into a conical clarifier 106 positioned within the aerator tank 105, as at 706. In some embodiments, the aerator vents 400 are configured to not direct air to a bottom of the conical clarifier 106. Further, receiving the influent fluid into the conical clarifier 106 may include receiving the at least some of the influent fluid through a lateral opening 620 in the conical clarifier 106 that is positioned between a bottom 410 and a top 412 of the conical clarifier 106.

The method 700 may further include separating the influent fluid in the conical clarifier 106 by gravity to generate an effluent fluid 660 and a solid waste 650, as at 708. The solid waste 650 may sink to the bottom 410 of the conical clarifier 106. The effluent fluid 660 may be directed to an effluent outlet positioned within the conical clarifier, as at 710. Directing the effluent fluid 660 to the effluent outlet 430 may also include using a weir 630 that surrounds the effluent outlet 430 to prevent floating sewage from entering the effluent outlet 430.

In some embodiments, the method 700 may also include directing the effluent fluid from the effluent outlet to a second clarifier, as at 720. The method 700 may further include directing the effluent fluid from the second clarifier to a filter tank, as at 722. The method 700 may also include directing the effluent fluid from the filter tank to an ultraviolet (UV) filter, as at 724. The method 700 may further include sterilizing the effluent fluid using the UV filter, as at 726. The method 700 may additionally include chlorinating the sterilized effluent fluid using an in-line chlorinator, as at 728. The method 700 may further include directing the sterilized, chlorinated effluent to a transfer tank, as at 730, and pumping the sterilized, chlorinated effluent into a wastewater tank, as at 732. In some embodiments, the effluent fluid may not be pumped between the effluent outlet and the transfer tank, but may be moved by gravity.

The method 700 may further include receiving a secondary flow of wastewater from a secondary source 114 that is contaminated with contaminant that would inhibit bacteria activity in the aerator tank 105 (e.g., hydrocarbons or bleach), as at 734, and combining the secondary flow of wastewater with the sterilized, chlorinated effluent downstream from the wastewater tank 112, as at 736.

The method 700 may also include positioning the aerator tank 105 and the clarifier 106 into a mobile container 350, as at 738. The method 700 may also include positioning a freshwater holding assembly 250 that is not in fluid communication with the aerator tank 105 into the mobile container 350, as at 740, and moving the mobile container with the aerator tank and clarifier and the freshwater system positioned therein, as at 742.

As used herein, the terms "inner" and "outer"; "up" and "down"; "upper" and "lower"; "upward" and "downward"; "above" and "below"; "inward" and "outward"; "uphole" and "downhole"; and other like terms as used herein refer to relative positions to one another and are not intended to denote a particular direction or spatial orientation. The terms "couple," "coupled," "connect," "connection," "connected," "in connection with," and "connecting" refer to "in direct connection with" or "in connection with via one or more intermediate elements or members."

The foregoing has outlined features of several embodiments so that those skilled in the art may better understand the present disclosure. Those skilled in the art should appreciate that they may readily use the present disclosure as a basis for designing or modifying other processes and structures for carrying out the same purposes and/or achieving the same advantages of the embodiments introduced herein. Those skilled in the art should also realize that such equivalent constructions do not depart from the spirit and scope of the present disclosure, and that they may make various changes, substitutions, and alterations herein without departing from the spirit and scope of the present disclosure.

What is claimed is:

1. A bioreactor for a water treatment system, the bioreactor comprising:
   an aerator tank configured to receive an influent liquid;
   a clarifier positioned in the aerator tank, the clarifier having a generally conical shape and defining a downwardly-facing opening, wherein an interior of the clarifier is in communication with the aerator tank, external to the clarifier, at least via the downwardly-facing opening, and wherein the clarifier is positioned nonconcentrically with the aerator tank;
   a plurality of aeration vents positioned proximal to a bottom of the tank and configured to direct air into the aerator tank;
   an effluent outlet positioned in the clarifier, wherein a relatively clean effluent liquid, in comparison to the influent liquid in the aerator tank, exits from the clarifier via the effluent outlet; and
   a plurality of aeration lines connected to the plurality of aeration vents, wherein the aeration lines extend along a bottom of the aerator tank, wherein at least one of the aeration lines extends through a wall of the aerator tank, proximal to the bottom of the aerator tank.

2. The bioreactor of claim 1, wherein the effluent outlet comprises a weir configured to prevent solid matter from entering into the effluent outlet.

3. The bioreactor of claim 1, wherein the bioreactor is configured to be positioned in a mobile container, such that the bioreactor is mobile.

4. The bioreactor of claim 1, wherein the clarifier occupies a volume that is less than about $\frac{1}{8}^{th}$ of a volume of the aerator tank.

5. A bioreactor for a water treatment system, the bioreactor comprising:
   an aerator tank configured to receive an influent liquid;
   a clarifier positioned in the aerator tank, the clarifier having a generally conical shape and defining a downwardly-facing opening, wherein an interior of the clarifier is in communication with the aerator tank, external to the clarifier, at least via the downwardly-facing opening, and wherein the clarifier is positioned nonconcentrically with the aerator tank;
   a plurality of aeration vents positioned proximal to a bottom of the tank and configured to direct air into the aerator tank;
   an effluent outlet positioned in the clarifier, wherein a relatively clean effluent liquid, in comparison to the influent liquid in the aerator tank, exits from the clarifier via the effluent outlet; and
   a stand having a base configured to receive the clarifier, wherein the stand is supported from a bottom of the aerator tank.

6. The bioreactor of claim 5, wherein the base of the stand is polygonal in shape and has a maximum cross-sectional dimension that is smaller than a maximum diameter of the clarifier, such that the clarifier is configured to be seated into the stand.

7. A water treatment system, comprising:
a bioreactor comprising:
an aerator tank configured to receive an influent liquid;
a first clarifier positioned in the aerator tank, the first clarifier having a generally conical shape and defining a downwardly-facing opening, wherein an interior of the first clarifier is in communication with the aerator tank, external to the first clarifier, at least via the downwardly-facing opening, and wherein the first clarifier is positioned non-concentrically with the aerator tank;
a plurality of aeration vents positioned proximal to a bottom of the tank and configured to direct air into the aerator tank; and
an effluent outlet positioned in the clarifier, wherein a relatively clean effluent liquid, in comparison to the influent liquid in the aerator tank, exits from the clarifier via the effluent outlet;
a second clarifier in communication with the effluent outlet of the clarifier of the bioreactor;
a filter tank in fluid communication with the second clarifier;
an ultraviolet (UV) filter in fluid communication with the filter tank;
a chlorinator in fluid communication with the UV filter; and
a transfer tank in fluid communication with the chlorinator.

8. The system of claim 7, further comprising a single container, wherein the bioreactor, second clarifier, filter tank, UV filter, chlorinator, and transfer tank are positioned within the single container, wherein the single container is configured to be moved between well sites.

9. The system of claim 7, wherein the effluent fluid liquid is not pumped between the second clarifier and the transfer tank, but is moved by gravity.

10. The system of claim 7, further comprising a plurality of flexible pipes, wherein the effluent outlet and the second clarifier communicate via one or more of the flexible pipes, the second clarifier and the filter tank communicate via one or more of the flexible pipes, the filter tank and the transfer tank communicate via one or more flexible pipes and via the chlorinator and the UV filter.

11. The system of claim 7, wherein the first clarifier occupies a volume that is less than about $\frac{1}{8}^{th}$ of a volume of the aerator tank.

12. The system of claim 7, wherein the bioreactor further comprises a plurality of aeration lines connected to the plurality of aeration vents, wherein the aeration lines extend along a bottom of the aerator tank.

13. The system of claim 12, wherein at least one of the aeration lines extends through a wall of the aerator tank, proximal to the bottom of the aerator tank, and wherein the aeration vents are not positioned directly below the first clarifier.

14. The system of claim 12, wherein the bioreactor further comprises a stand having a base configured to receive the first clarifier, wherein the stand is supported from a bottom of the aerator tank.

15. The system of claim 12, wherein the base of the stand is polygonal in shape and has a maximum cross-sectional dimension that is smaller than a maximum diameter of the clarifier, such that the clarifier is configured to be seated into the stand.

* * * * *